United States Patent
Zhang

(12) 
(10) Patent No.: US 7,257,664 B2
(45) Date of Patent: Aug. 14, 2007

(54) ADAPTIVE ERROR RESILIENCE FOR SIGNAL TRANSMISSION OVER A NETWORK

(75) Inventor: Chengdong Zhang, Victoria (CA)

(73) Assignee: Lambert Everest Ltd., Tortola (VG)

( * ) Notice: Subject to any disclaimer, the term of this patent is extended or adjusted under 35 U.S.C. 154(b) by 0 days.

(21) Appl. No.: 10/326,266

(22) Filed: Jun. 6, 2003

(65) Prior Publication Data

US 2003/0212943 A1  Nov. 13, 2003

Related U.S. Application Data

(60) Provisional application No. 60/342,897, filed on Dec. 21, 2001.

(51) Int. Cl.
*G11C 29/00* (2006.01)
(52) U.S. Cl. .................. 710/710; 714/748; 714/751

(58) Field of Classification Search ............... 714/747, 714/758, 710, 748, 751; 375/240, 27
See application file for complete search history.

(56) References Cited

U.S. PATENT DOCUMENTS 6,278,716 B1 * 8/2001 Rubenstein et al. ......... 370/432
6,289,054 B1 * 9/2001 Rhee ...................... 375/240.27

* cited by examiner

*Primary Examiner*—Guy Lamarre
*Assistant Examiner*—Esaw Abraham
(74) *Attorney, Agent, or Firm*—Cook, Alex, McFarron, Manzo, Cummings & Mehler, Ltd.

(57) ABSTRACT

Systems and methods for adaptive error correction optimize data rate and video quality. Optimized data rate allocation is particularly important in systems that support video communication over wireless channels. By using proactive repair redundancy information, data rate may be dynamically partitioned to optimize the bandwidth capacity while supporting the highest video quality.

10 Claims, 18 Drawing Sheets

$\rho = 1.0$ $\rho = 1.2$

ADAPTIVE ERROR RESILIENCE FOR SIGNAL TRANSMISSION OVER A NETWORK

RELATED APPLICATIONS

This patent application claims the benefit of U.S. Provisional Application No. 60/342,897, filed Dec. 21, 2001, the entire content of which is hereby incorporated by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Wireless streaming video transport is challenging. The error-prone nature of wireless networks usually causes channel congestion, which results in a serious loss of signal packets, especially when motion is involved.

Video signals require very high bandwidth if they are transmitted in raw form. To save on bandwidth, video signals are often compressed into variable bit-rate (VBR) output stream containing control information (e.g., frame headers) whose loss could lead to misinterpretation or discarding of a large portion of otherwise correctly received data, thus resulting in a significant drop in visual quality.

Wireless streaming video communication is particularly challenging because it combines the already difficult problem of efficient compression with the additional and usually contradictory need to make the compressed bit stream robust to channel errors.

A good error resilient application system is Quality of Service (QoS) adaptive. QoS may be used to describe the overall performance of a communication system. To be QoS adaptive is to trade off different QoS requirements. For wireless video applications, QoS may be measured by the reliability, latency, and bandwidth usage, which are in terms of Peak Signal to Noise Ratio (PSNR), Packet Loss Rate (PLR), Delay, Delay Variation/Jitter, and Bit Throughput Rate (BTR).

There is no clear mathematical model that can be used when channel congestion happens, the QoS requirements are often too conflicting to compromise, and the endeavors to make application systems robust are significantly complicated. Protocol may depend on the tradeoff between performance gain and acceptable cost/complexity. Techniques for error resilience may be classified as: 1) source level; 2) channel level; 3) receiver level; or 4) system level.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for adaptive error resilience, substantially as shown in and/or described in connection with at least one of the figures, as set forth more completely in the claims.

These and other advantages and novel features of the present invention will be more fully understood from the following description.

DETAILED DESCRIPTION OF THE INVENTION

According to certain aspects of the present invention, a system and method for adaptive error resilience are presented. This system and method for adaptive error resilience may control QoS requirements dynamically. This system and method may be integrated into existing video codec application systems and may adapt to media characteristics and channel conditions.

Figure 1:
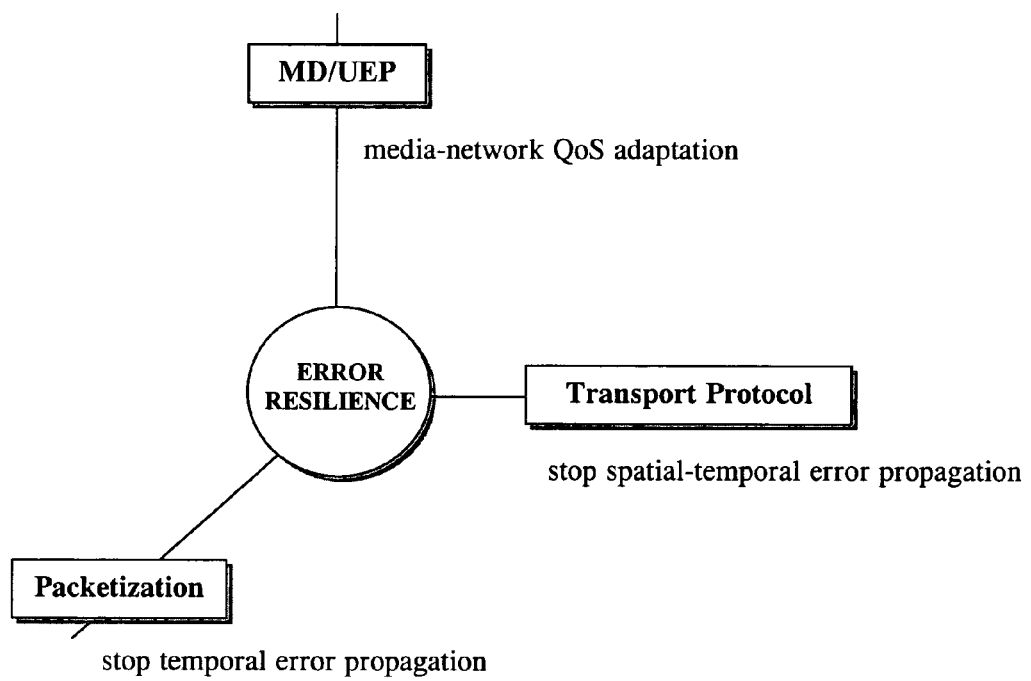
FIG. 1 is a diagram of the multi-dimensional approach to error resilience in accordance with an embodiment of the present invention.

FIG. 1 is a diagram of the multi-dimensional approach to error resilience in accordance with an embodiment of the present invention. The tradeoffs between 2 and 3 dimensions depend on complexity and overhead.

Figure 2:
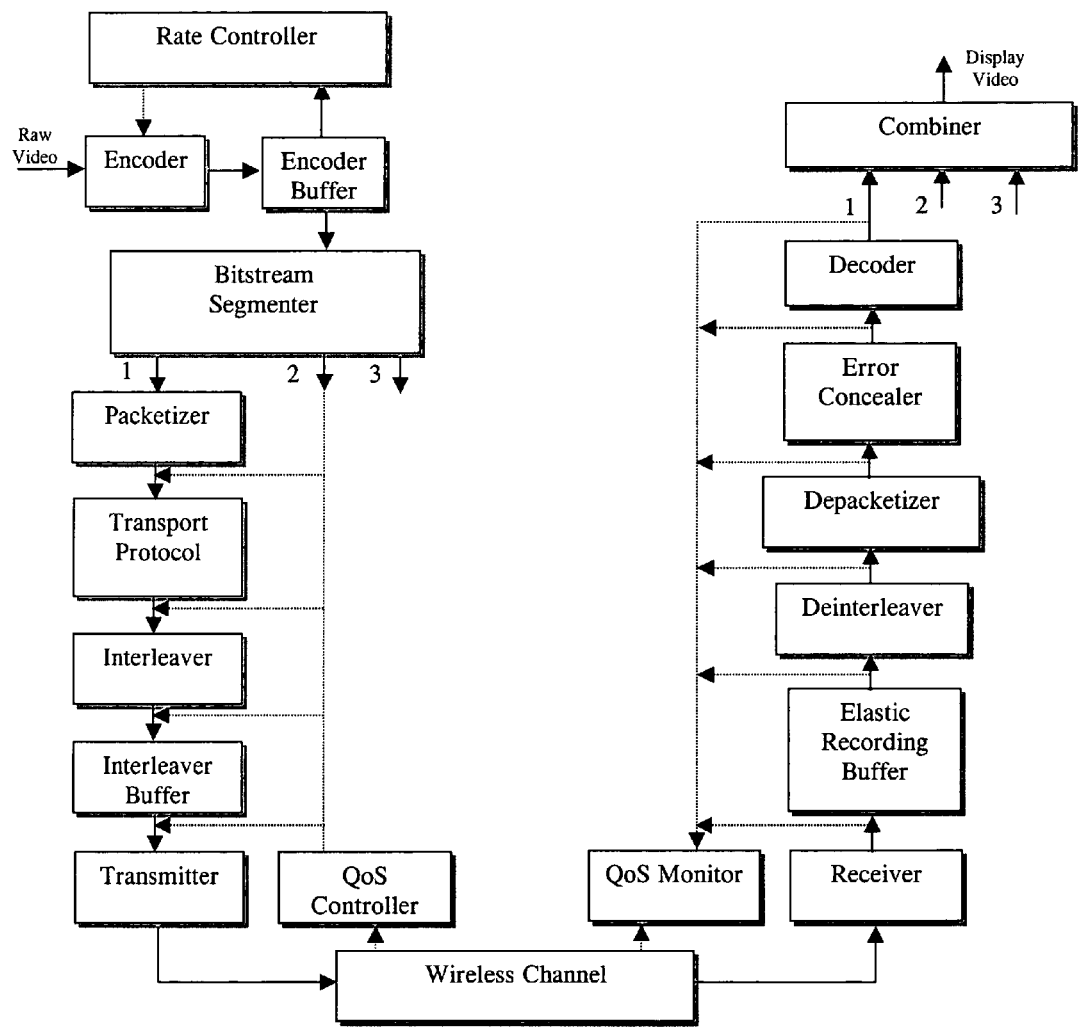
FIG. 2 is a functional block diagram of logical levels in a system for error resilience in accordance with an embodiment of the present invention.

FIG. 2 is a functional block diagram of logical levels in a system for error resilience in accordance with an embodiment of the present invention. Rate control that is provided by the rate controller on the transmit side may smooth the source stream jitter. This rate control is based on the buffer contents and is provided to the source encoder. The receiver is operably connected to an elastic reordering buffer to absorb jitter from a WLAN channel.

Figure 3:
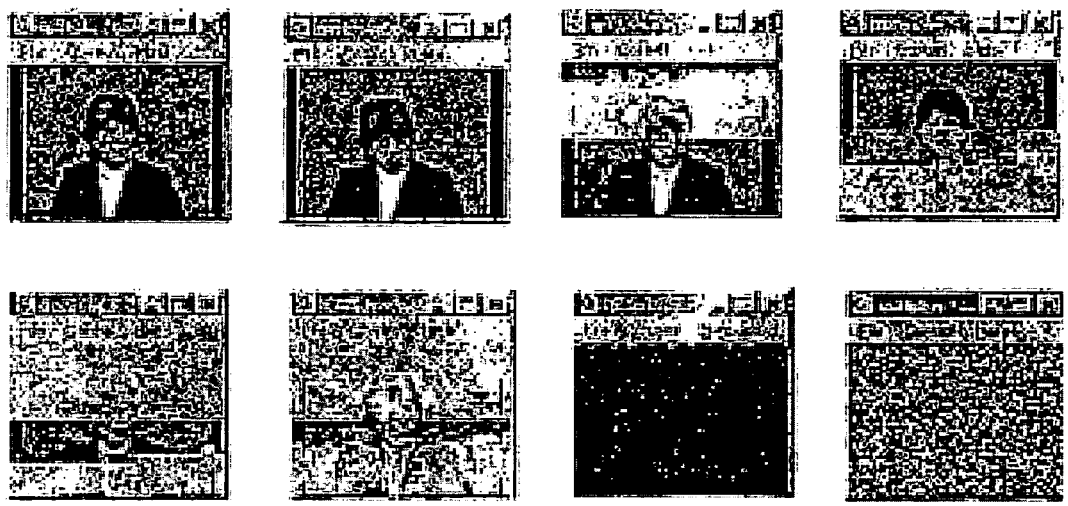
FIG. 3 is a series of video frames received with various degrees of error.

FIG. 3 is a series of video frames having various degrees of error. Small errors at important portions of a compressed signal may cause a high degree of packet loss. A low throughput across a wireless channel may be caused by motion, fading effects, network congestion, multipath delay, and dropped packets. Commercial streaming systems may work poorly on wireless networks. A codec, by itself, may not solve the problems of streaming systems. QoS adaptive systems may perform better than a codec alone.

QoS describes performance in terms of 1) Reliability, e.g. peak signal-to-noise ratio (PSNR) and packet loss rate (PLR); 2) Latency, e.g. round-trip time (RTT) and jitter; 3) and Bandwidth Usage, e.g. bit throughput rate (BTR). Steaming video may be most sensitive to BTR.

Figure 4:
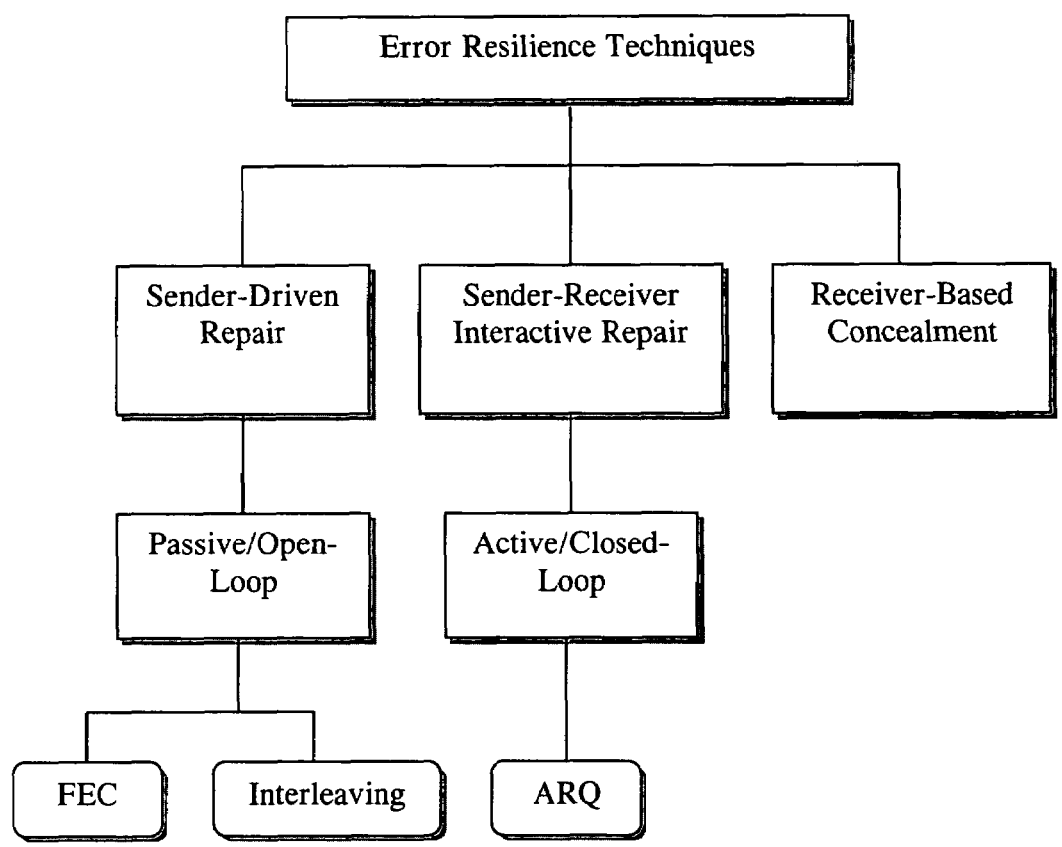
FIG. 4 is a diagram of error resilience techniques that are combined in a system for error resilience in accordance with an embodiment of the present invention.

FIG. 4 is a diagram of error resilience techniques that are combined in a system for error resilience in accordance with an embodiment of the present invention. The enhanced error resilience system is based on: 1) Source-level compression, forward error correction, coding, and interleaving; 2) Channel-level retransmission; and 3) Receiver-level post-processing concealment.

Repair and concealment may be complementary. Repair may be applied at the transmitter to correct some channel loss, while concealment may be applied at the receiver to patch over the remaining channel loss. The repair technique may be QoS adaptive while facilitating the concealment.

Redundancy for repair may be added before or after packetization for graceful degradation of visual quality—rather than a sharp drop in visual quality. Redundancy may be sent with reactive or proactive methods. For example, Repeat on Request is reactive. Repeat on Request methods such as ARQ have delay bottlenecks.

Parallel as Separate Data Stream is an example of a proactive method. Parallel as Separate Data Stream may waste bandwidth and increase the chance of congestion greatly. Send as Extra Packets in the Same Data Stream and Piggybacked to the Same Packet are other examples of proactive methods. Media-Independent FEC (MIFEC) is an example of Send as Extra Packets in the Same Data Stream. Media-Specific FEC (MSFEC) is an example of Piggybacked to the Same Packet.

Figure 5:
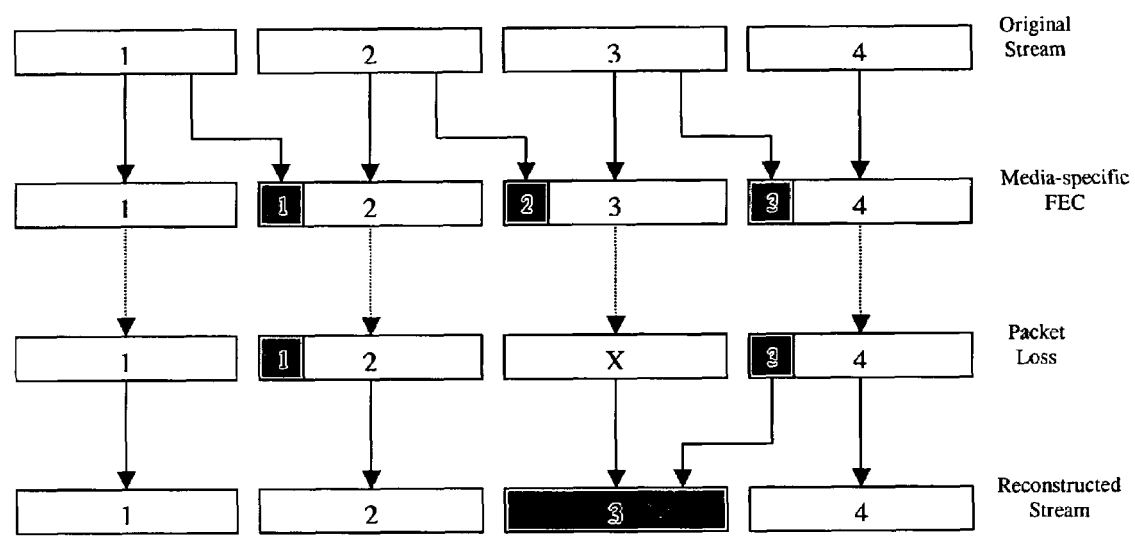
FIG. 5 is a diagram of an exemplary method for media specific forward error correction (MSFEC) repair in accordance with an embodiment of the present invention.

FIG. 5 is a diagram of an exemplary method for media specific forward error correction (MSFEC) repair in accordance with an embodiment of the present invention. High priority data may be the least robust to errors and the least effectively post-processed. Therefore, high priority data may need special protection. Portions of a compressed bitstream, such as headers and intra-coded data may be considered high priority data. Repair data may be pieces of redundant high priority data. If repair data cannot be duplicated (i.e., they are piggybacked to other packets for the recovery of specific packets), the repair data may be compressed to fit available channel packet space.

Figure 6:
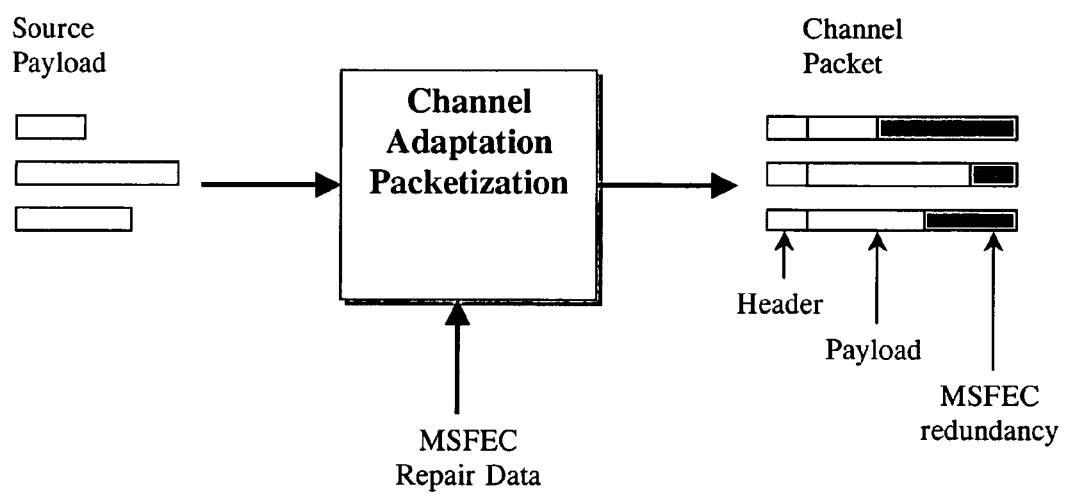
FIG. 6 is a diagram of an exemplary system for MSFEC packetization in accordance with an embodiment of the present invention.

FIG. 6 is a diagram of an exemplary system for MSFEC packetization in accordance with an embodiment of the present invention. The source payload may be variable in size, and the channel packet may be a fixed length. If repair data cannot be duplicated, it may be compressed to fit the channel space available.

Figure 7:
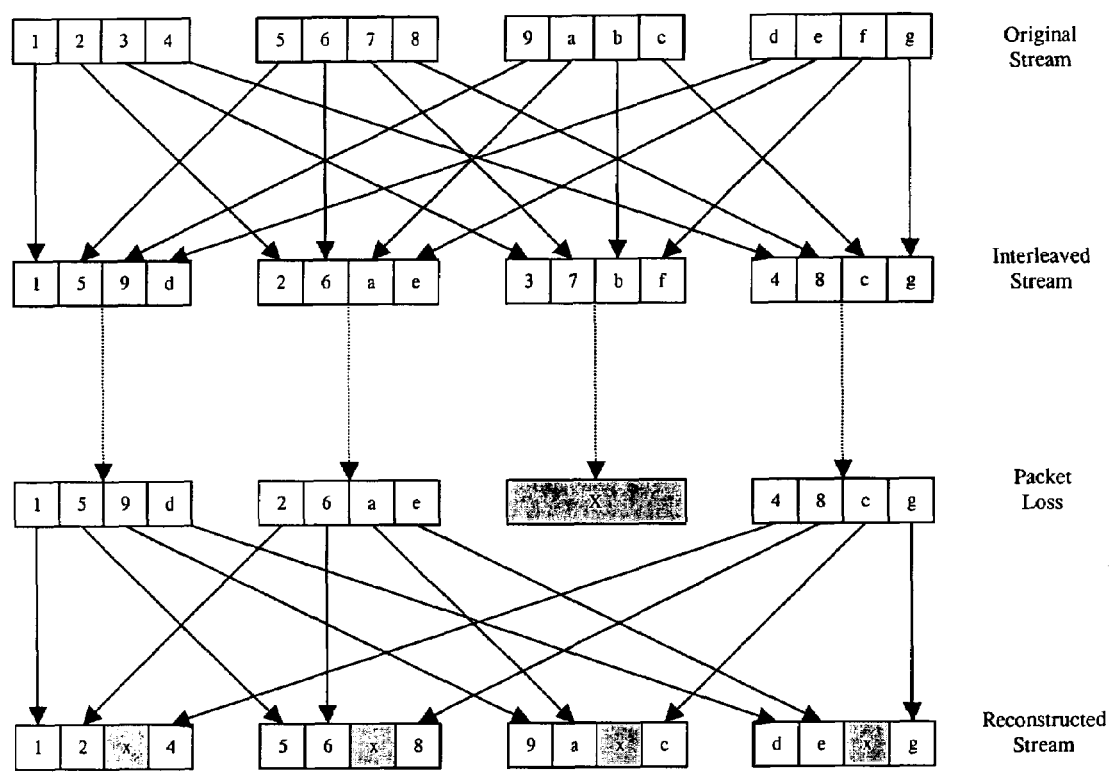
FIG. 7 is a diagram of an exemplary method for interleaving MSFEC packets in accordance with an embodiment of the present invention.

FIG. 7 is a diagram of an exemplary method for interleaving MSFEC packets in accordance with an embodiment of the present invention. Interleaving may spread out large gaps to benefit other resilience techniques. Interleaving may also reduce the perceived effect of packet loss. For proactive transmission of repair redundancy, the sender decides a priori how much redundancy to send for each block of data. For example, proactive transmission of repair redundancy for MSFEC may require 3 or 4 well-interleaved repair packets.

Figure 8:
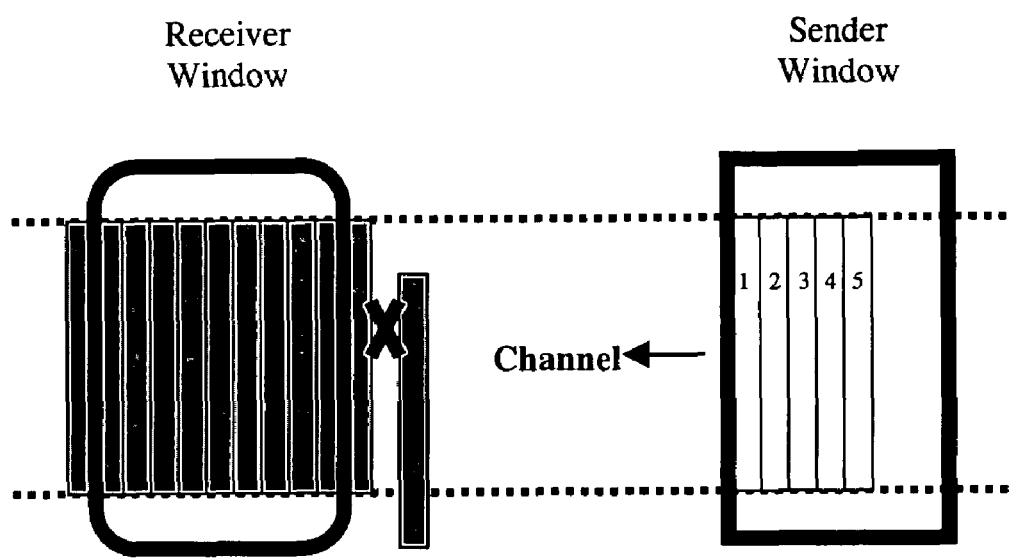
FIG. 8 is a diagram of proactive media-specific repair in accordance with an embodiment of the present invention.

FIG. 8 is a diagram of proactive media-specific repair in accordance with an embodiment of the present invention. The packets to the left of the receiver window have already been delivered to an application. The packets within the receiver window are stored in a buffer. The packets to the right of the receiver window have been dropped before they could be received. The sender window contains packets that have been sent but not yet acknowledged.

Figure 9:
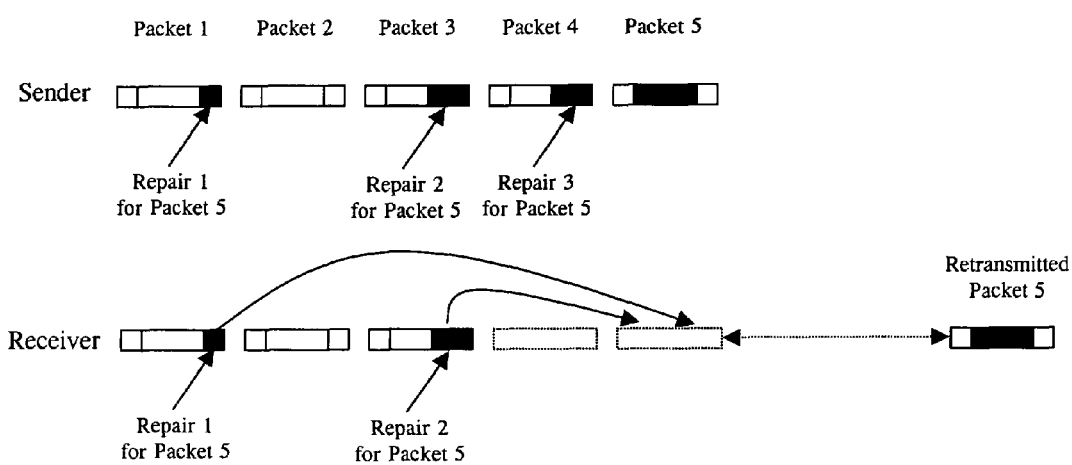
FIG. 9 is an illustration of MSFEC repair in combination with ARQ repair in accordance with an embodiment of the present invention.

FIG. 9 is an illustration of MSFEC repair in combination with ARQ repair in accordance with an embodiment of the present invention. For example, it has been determined that packet 5 needs protection. Repair packets for packet 5 are sent in packet 1, packet 3, and packet 4. When a bursty error occurs over the channel and corrupts packet 5, packet 5 may be repaired through MSFEC or by using a retransmitted packet. These two methods of repair may work independently. The decoder can select the repaired packet from either ARQ repair or MSFEC repair.

Figure 10:
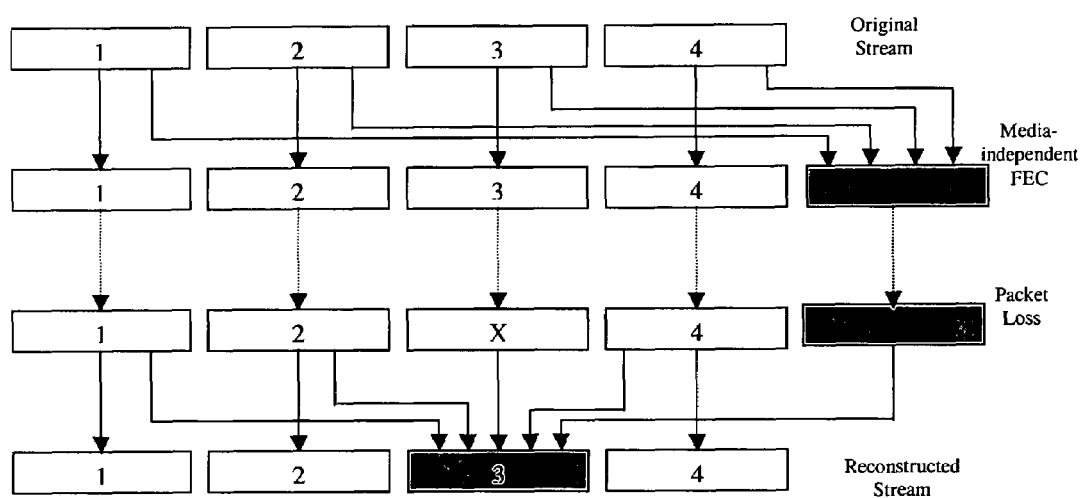
FIG. 10 is a diagram of an exemplary method for media independent forward error correction (MIFEC) repair in accordance with an embodiment of the present invention.

FIG. 10 is a diagram of an exemplary method for media independent forward error correction (MIFEC) repair in accordance with an embodiment of the present invention. Repair packets may be sent as redundancy containing check information for a data packet. Repair packets may be sent as extra packets in the same data stream as the data packet.

Figure 11:
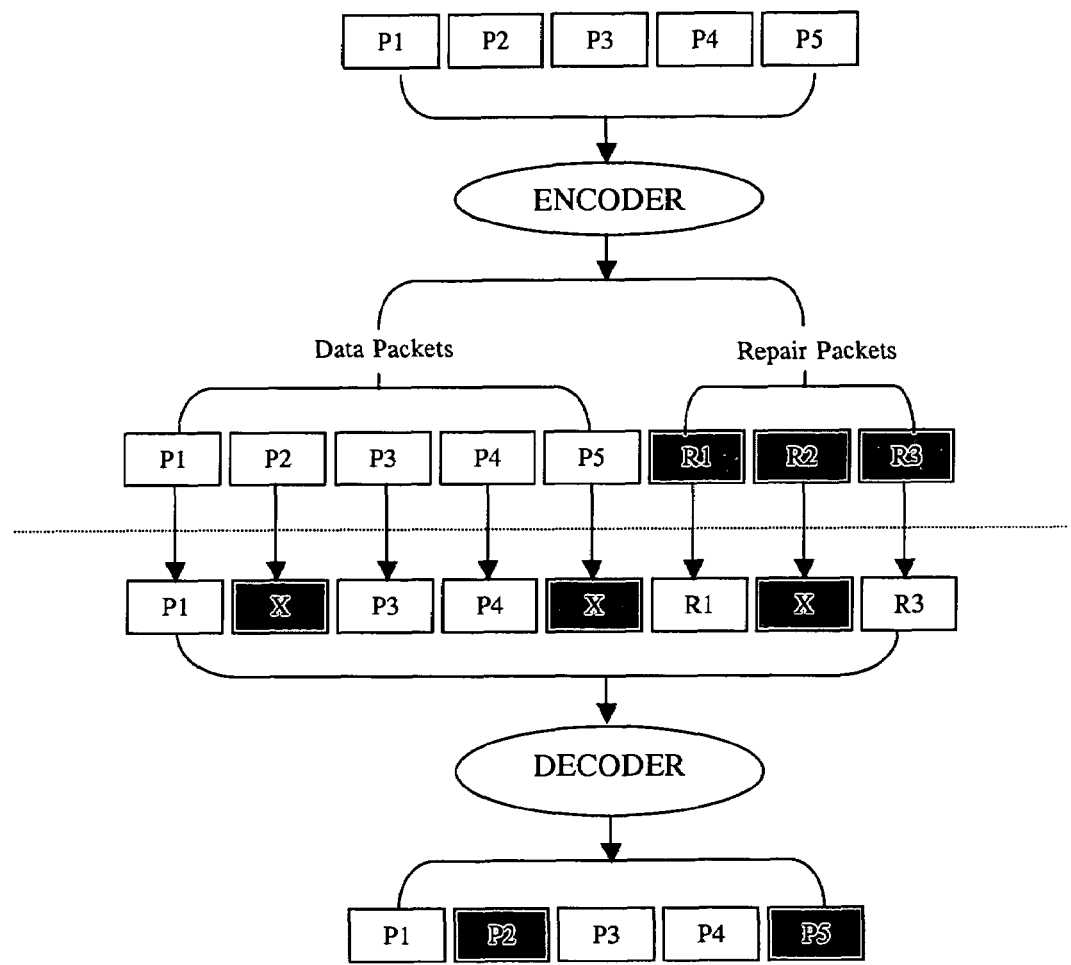
FIG. 11 is a diagram of an exemplary method for packet-level error correction coding for MIFEC in accordance with an embodiment of the present invention.

FIG. 11 is a diagram of an exemplary method for packet-level error correction coding for MIFEC in accordance with an embodiment of the present invention. Recovery by the receiver depends on the total number of packets received, not on the packets themselves. Any repair packet can recover a random data packet.

Figure 12:
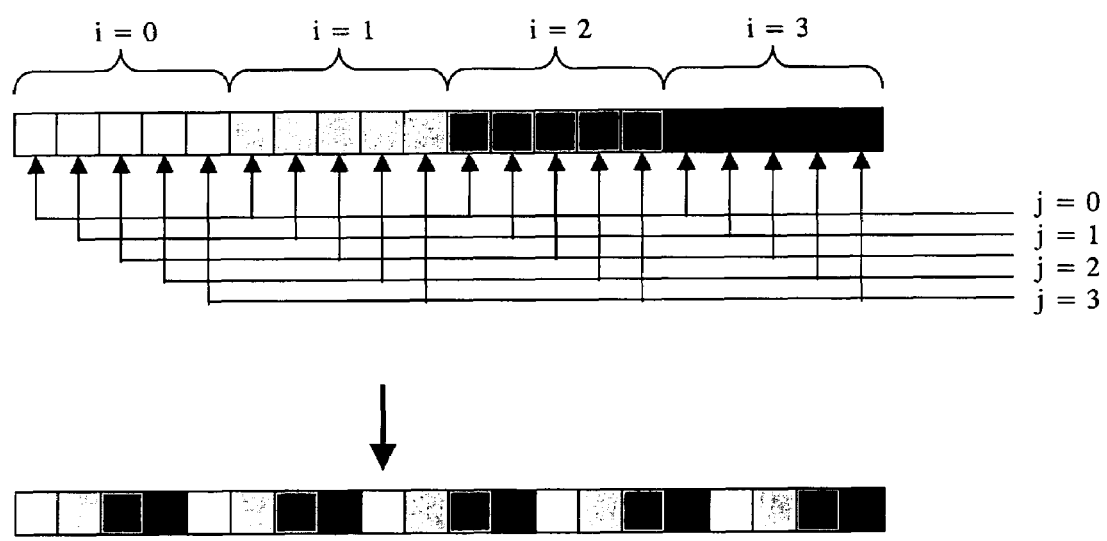
FIG. 12 is a diagram of an exemplary method for block interleaving of data packets and repair packets for MIFEC in accordance with an embodiment of the present invention.

FIG. 12 is a diagram of an exemplary method for block interleaving data packets and repair packets for MIFEC in accordance with an embodiment of the present invention. For example, packets may form 4 rows and portions of packets form 5 columns. When the rows and columns are interchanged, the repair packets are interleaved with the data packets.

Proactive transmission of repair redundancy for MIFEC may be based on a proactivity factor ($\rho$) according to the statistical link conditions. FIG. 13$a$ is a diagram of an exemplary method for selectively combining ARQ with MIFEC in accordance with an embodiment of the present invention. In the example shown in FIG. 13$a$, the proactivity factor is set to 1.0 to signify that no repair packets are sent proactively, and retransmission is required for the repair of a lost packet.

Figure 13A:
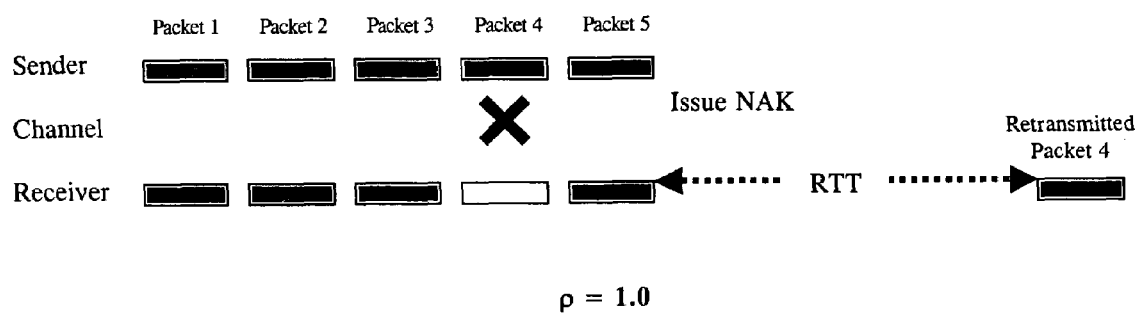
FIG. 13a is a diagram of an exemplary method for selectively combining ARQ with MIFEC in accordance with an embodiment of the present invention.
Figure 13B:
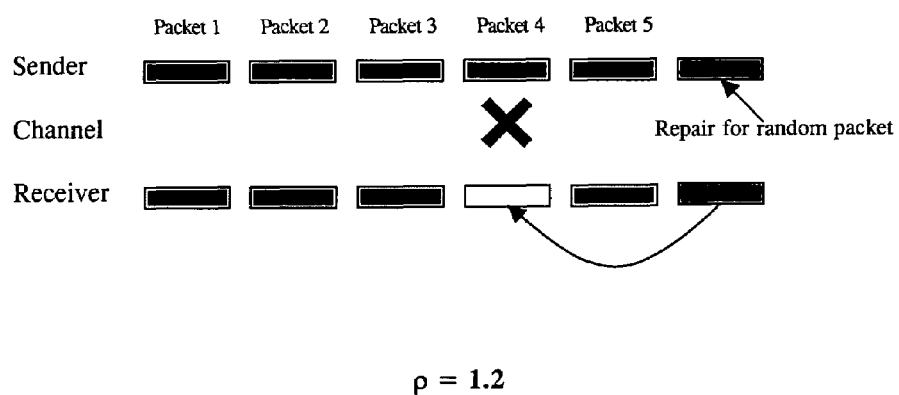
FIG. 13b is a diagram of another exemplary method for selectively combining ARQ with MIFEC in accordance with an embodiment of the present invention.

FIG. 13$b$ is a diagram of another exemplary method for selectively combining ARQ with MIFEC in accordance with an embodiment of the present invention. In the example shown in FIG. 13*a*, the proactivity factor is set to 1.2 to signify that one repair packet is sent proactively for every 5 data packets.

The MSFEC approach, in FIG. 5, may add redundancy while keeping the original bitrate regardless of whether or not the correcting capability of the code has been exceeded. The MIFEC approach, in FIG. 10, may add redundancy that lowers the coding efficiency.

MSFEC alone may be better suited for the definition of a new codec. MSFEC may be more associated with source compression coding based on the properties of the signal. MSFEC may save bandwidth by modifying the output of a source codec. MSFEC may use a lower bandwidth than MIFEC and may introduce only a single-packet delay. However, MSFEC may not be an exact replacement for a lost packet and may require extra complexity to code each unit more than once.

MIFEC alone may be better suited for an existing codec. MIFEC may be more associated with channel error correction coding based on exclusive or operations. MIFEC may provide an exact replacement for a lost packet and computation complexity is small. However, MIFEC may use more bandwidth than MSFEC and may introduce more delay due to the blocking of packets.

Figure 14:
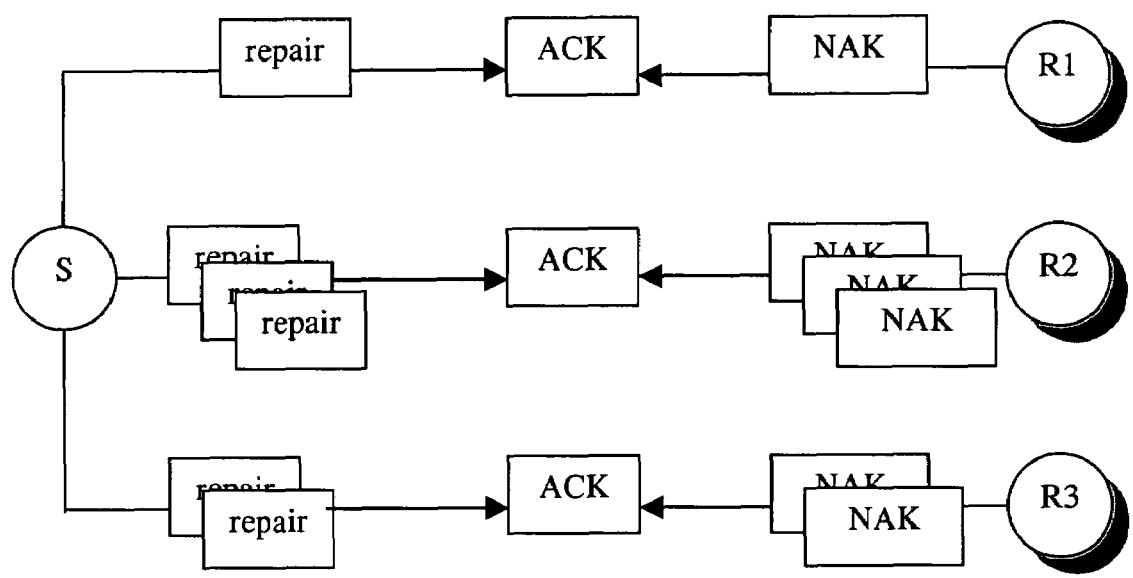
FIG. 14 is a diagram of a transformation from multicast into unicast.

Wireless networks such as Wireless Local Area Networks (WLANs) may use an IP-based multicast system. FIG. 14 is a diagram of a transformation from multicast into unicast (MCU). The MCU system may suffer from congestion bottleneck from the implosion of too many repair requests.

Figure 15:
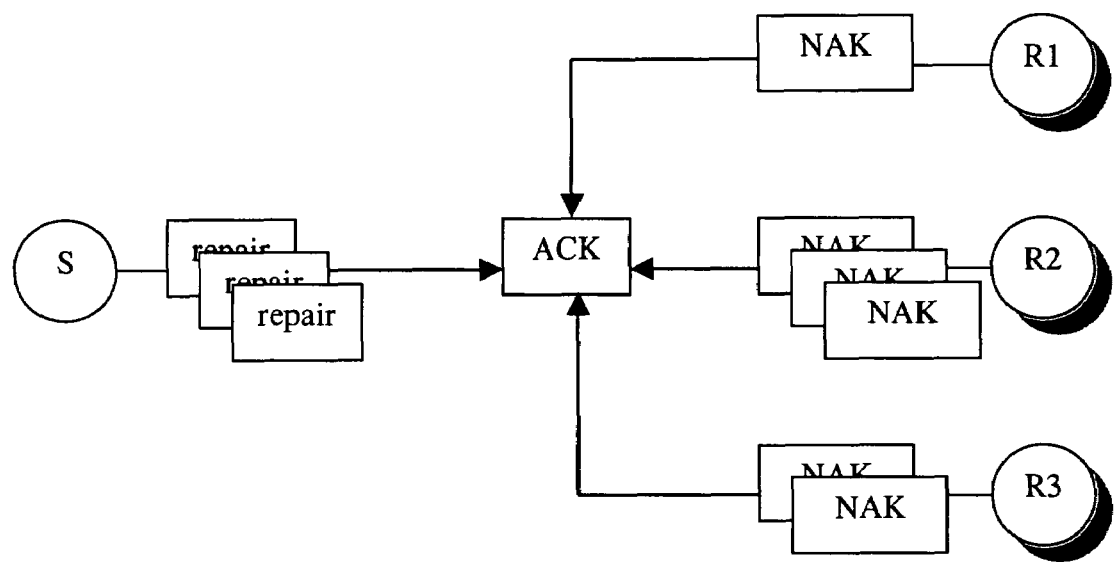
FIG. 15 is a diagram of the adaptation of MIFEC to an IP-based network in accordance with an embodiment of the present invention.

FIG. 15 is a diagram of the adaptation of MIFEC to an IP-based network in accordance with an embodiment of the present invention. The receiver in this system may suppress its own non-acknowledgement (NAK). Proactive FEC may simultaneously repair losses with fewer parity packets. The proactivity factor may be based on the worst link.

Figure 16:
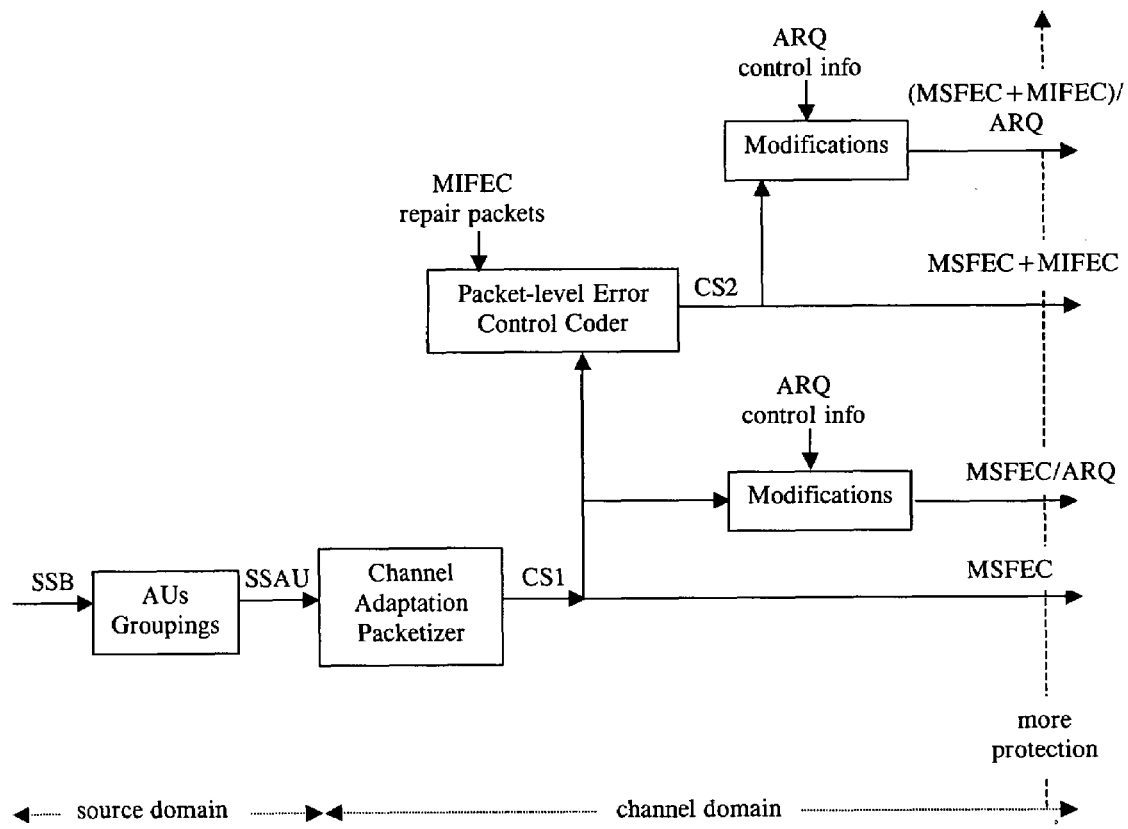
FIG. 16 is a block diagram of a robust packetization and resilient transport protocol in accordance with an embodiment of the present invention.

FIG. 16 is a block diagram of a robust packetization and resilient transport protocol in accordance with an embodiment of the present invention. A Source Stream of Bits (SSB) is grouped into a Source Stream of Access Units (SSAU). In the H.263 standard for example, an Access Unit (AU) is a Group of Blocks (GOB). In the MPEG-4 standard, an AU is a slice. The SSAU is packetized into a first Channel Stream (CS1) which includes MSFEC.

An error resiliency choice may be the use of MSFEC alone by transmitting CS1. Depending on the additional level of protection required, the CS1 may be supplemented by ARQ. Alternatively, the CS1 may be reformatted into a second Channel Stream (CS2) to add repair packets through MIFEC in addition to the redundancy information already included in CS1. As with CS1, CS2 may also be supplemented by ARQ to result in a higher level of protection for the data packets.

Figure 17:
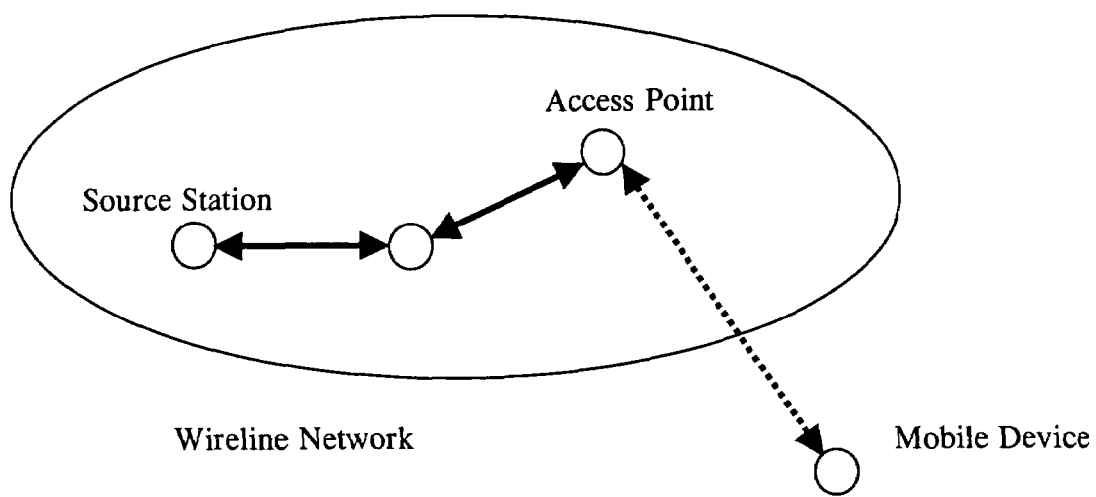
FIG. 17 is a diagram of an IEEE 802.11 WLAN system in accordance with an embodiment of the present invention.

FIG. 17 is a diagram of an IEEE 802.11 WLAN in accordance with an embodiment of the present invention. WLAN may provide a video data access point to mobile devices.

Figure 18:
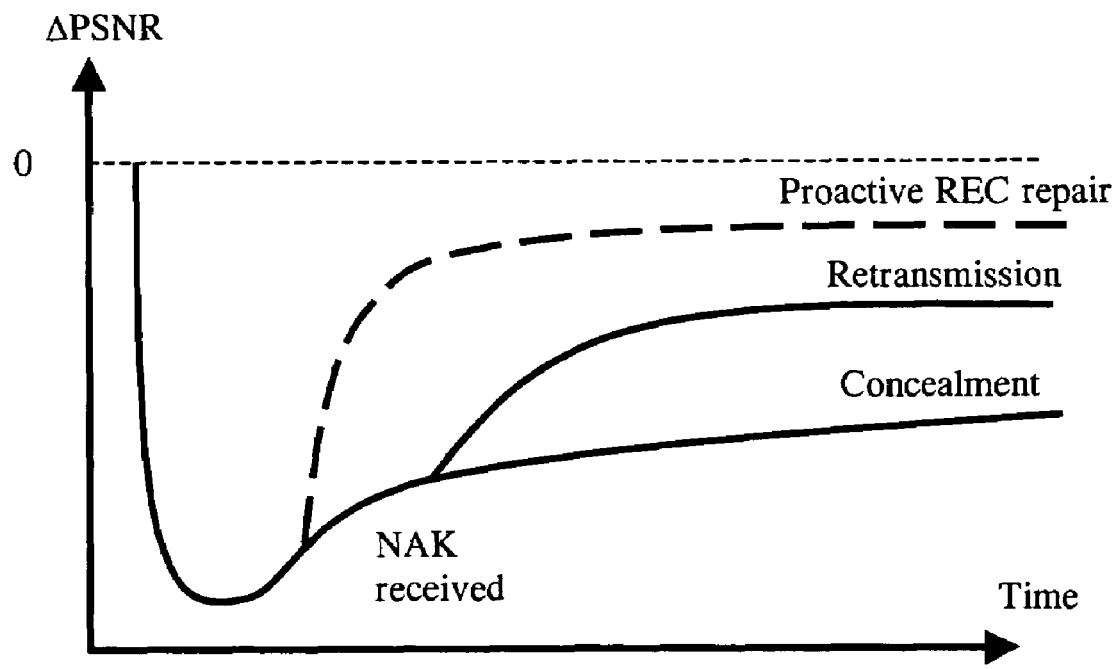
FIG. 18 is a diagram of a performance comparison between concealment, retransmission, and proactive FEC repair.

FIG. 18 is a diagram of a performance comparison between concealment, retransmission, and proactive FEC repair.

The embodiments described herein may be implemented as a board level product, as a single chip, application specific integrated circuit (ASIC), or with varying levels of system integration.

The degree of integration of the transmitter and receiver may primarily be determined by the speed and cost considerations. Because of the sophisticated nature of modern processor, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware. Alternatively, the foregoing can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on the WLAN standard, the invention can be applied to data encoded with a wide variety of standards.

Therefore, it is intended that the present invention not be limited to the particular embodiment disclosed, but that the present invention will include all embodiments falling within the scope of the appended claims.

What is claimed is:

1. A method of receiving a plurality of packets having proactive repair redundancy information, the method comprising:
   receiving the plurality of packet, wherein the plurality of packets comprises at least a first data packet, a second data packet, and a repair packet;
   decoding the first data packet based on proactive repair redundancy information in the second data packet, thereby generating a first decoding candidate for the first packet;
   decoding the first data packet based on proactive repair redundancy information in the repair packet, thereby generating a second decoding candidate for the first packet; and
   selecting between the first decoding candidate and the second decoding candidate.

2. The method of claim 1, wherein the plurality of packets received from a wireless channel.

3. The method of claim 1, wherein the plurality of packets is formed according to IEEE 802.11 standard.

4. The method of claim 1, the plurality of packets is decoded according to H.263 standard.

5. The method of claim 1, wherein the plurality of packets is decoded according to MPEG-4 standard.

6. The method of claim 1, wherein the method further comprises re-receiving the first data packet upon request.

7. A system for receiving a plurality of packets having proactive repair redundancy information, the system comprising:
   a receiver for receiving the plurality of packets, wherein the plurality of packets comprises at least a first data packet, a second data packet, and a repair packet; and
   a decoder for decoding the first data packet based on proactive repair redundancy information in the second data packet and decoding the first data packet based on proactive repair redundancy information in the repair packet, thereby generating a first decoding candidate for the first packet and a second decoding candidate for the first packet respectively, wherein the decoder selects between the first decoding candidate and the second decoding candidate.

8. The system of claim 7, wherein the plurality of packets is formed according to IEEE 802.11 standard.

9. The method of claim 7, wherein the system comprises a plurality of packets decoded according to H.263 standard.

10. The system of claim 7, wherein the system comprises a plurality of packets decoded according to MPEG-4 standard.

* * * * *